US012769450B2

(12) United States Patent
Wang et al.

(10) Patent No.: US 12,769,450 B2
(45) Date of Patent: Oct. 20, 2026

(54) METHOD, ELECTRONIC DEVICE, AND COMPUTER PROGRAM PRODUCT FOR DETECTING SEQUENTIAL STREAM

(71) Applicant: Dell Products L.P., Round Rock, TX (US)

(72) Inventors: Xuemin Wang, Beijing (CN); Juan Yan, Beijing (CN); Lei Gao, Beijing (CN); Chen Gong, Beijing (CN)

(73) Assignee: Dell Products L.P., Round Rock, TX (US)

( * ) Notice: Subject to any disclaimer, the term of this patent is extended or adjusted under 35 U.S.C. 154(b) by 82 days.

(21) Appl. No.: 18/368,201

(22) Filed: Sep. 14, 2023

(65) Prior Publication Data

US 2024/0302970 A1 Sep. 12, 2024

(30) Foreign Application Priority Data

Mar. 6, 2023 (CN) ......................... 202310232623.0

(51) Int. Cl.
*G06F 3/06* (2006.01)

(52) U.S. Cl.
CPC .......... *G06F 3/0613* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 10,255,213 | B1 * | 4/2019 | Habusha | G06F 3/0679 |
| 10,552,050 | B1 | 2/2020 | Verdan et al. | |
| 2008/0133872 | A1 * | 6/2008 | Fair | G06F 12/0862 711/204 |
| 2015/0178212 | A1 * | 6/2015 | Takamura | G06F 12/0802 711/137 |
| 2017/0031823 | A1 * | 2/2017 | Ross | G06F 12/0862 |
| 2020/0004540 | A1 * | 1/2020 | Navon | G06F 9/3832 |
| 2021/0157744 | A1 | 5/2021 | Benhanokh et al. | |
| 2022/0155995 | A1 * | 5/2022 | Jung | G06F 3/0679 |
| 2022/0222175 | A1 * | 7/2022 | Kato | G06F 12/0862 |
| 2023/0325090 | A1 | 10/2023 | Feld et al. | |

* cited by examiner

*Primary Examiner* — Jared I Rutz
*Assistant Examiner* — Elias Young Kim
(74) *Attorney, Agent, or Firm* — BainwoodHuang

(57) ABSTRACT

Techniques detect a sequential stream. Such techniques involve receiving a plurality of input/outputs (IOs). Such techniques further involve storing corresponding IO descriptors in a pool for the received plurality of IOs. Such techniques further involve predicting the plurality of IOs as a target sequential stream according to a plurality of IO descriptors stored in the pool that correspond to a first set of IOs. Such techniques further involve determining that the received plurality of IOs are the target sequential stream in response to detecting that the plurality of IO descriptors stored in the pool match a second set of IOs. The second set of IOs is a plurality of IOs sequentially arranged subsequent to the first set of IOs in the target sequential stream.

14 Claims, 6 Drawing Sheets

METHOD, ELECTRONIC DEVICE, AND COMPUTER PROGRAM PRODUCT FOR DETECTING SEQUENTIAL STREAM

CROSS-REFERENCE TO RELATED APPLICATION

This application claims priority to Chinese Patent Application No. CN202310232623.0, on file at the China National Intellectual Property Administration (CNIPA), having a filing date of Mar. 6, 2023, and having "METHODS, ELECTRONIC DEVICES, AND COMPUTER PROGRAM PRODUCTS FOR DETECTING SEQUENTIAL STREAM" as a title, the contents and teachings of which are herein incorporated by reference in their entirety.

TECHNICAL FIELD

Embodiments of the present disclosure relate to the technical field of computer storage and, more specifically, to a method, an electronic device, and a computer program product for detecting a sequential stream.

BACKGROUND

Operations for reading data from disks may be referred to as input/output (IO) operations. IO operations may include random IOs and sequential IOs. If required data is randomly scattered in different sectors on different pages of a disk, to find the corresponding data, it is necessary to wait until the magnetic arm (which plays the role of addressing) rotates to a specified page and then finds a corresponding sector on the disk in order to find a required chunk of data. This process is carried out in sequence until all the data is found, which is a random IO that has a low data reading speed. If the first chunk of data has been found, and the other required data is subsequent to this chunk of data, then there is no need to re-address, and the required data can be obtained in sequence, which is called a sequential IO.

An IO stream is input and output in the form of a stream, which is a set of sequential bytes that have a start point and an end point and that are used for data transmission. An input stream is used for reading data from a data source into a process, and an output stream is used for writing data from a process to a destination.

In a storage system, many functional modules need to know whether the current data access is sequential or random, in order to handle data streams with different characteristics accordingly. However, for sequential IO streams for multi-path concurrent accesses, the received IOs may not be sequentially arranged and thus may be mistaken for random IO streams, which can reduce the data access rate and thus reduce the access performance of the storage system.

SUMMARY OF THE INVENTION

According to example embodiments of the present disclosure, a technical solution for detecting a sequential stream is provided that can be used to accurately identify sequential IO streams in the case of multi-path concurrent accesses.

In a first aspect of the present disclosure, a method for detecting a sequential stream is provided. The method may include: receiving a plurality of input/outputs (IOs); storing corresponding IO descriptors in a pool for the received plurality of IOs; predicting the plurality of IOs as a target sequential stream according to a plurality of IO descriptors stored in the pool that correspond to a first set of IOs; and determining that the received plurality of IOs are the target sequential stream in response to detecting that the plurality of IO descriptors stored in the pool match a second set of IOs, wherein the second set of IOs are a plurality of IOs sequentially arranged subsequent to the first set of IOs in the target sequential stream. Implementation of the method provided in the first aspect can improve the efficiency and accuracy of detecting sequential streams.

In a second aspect of the present disclosure, an electronic device for detecting a sequential stream is provided. The electronic device includes: a processor; and a memory coupled to the processor and having instructions stored therein, where the instructions, when executed by the electronic device, cause the electronic device to perform operations including: receiving a plurality of input/outputs (IOs); storing corresponding IO descriptors in a pool for the received plurality of IOs; predicting the plurality of IOs as a target sequential stream according to a plurality of IO descriptors stored in the pool that correspond to a first set of IOs; and determining that the received plurality of IOs are the target sequential stream in response to detecting that the plurality of IO descriptors stored in the pool match a second set of IOs, wherein the second set of IOs are a plurality of IOs sequentially arranged subsequent to the first set of IOs in the target sequential stream. Implementation of the electronic device provided in the second aspect can improve the efficiency and accuracy of detecting sequential streams.

In a third aspect of the present disclosure, a computer program product is provided. The computer program product is tangibly stored in a computer-readable medium and includes computer-executable instructions, wherein the computer-executable instructions, when executed, cause a machine to perform the method according to the first aspect of the present disclosure.

In a fourth aspect of the present disclosure, a computer-readable storage medium having a computer program stored thereon is provided, wherein the computer program, when executed by a device, causes the device to perform the method according to the first aspect of the present disclosure.

As can be seen from the above description, the solution according to embodiments of the present disclosure can improve the efficiency and accuracy of detecting sequential streams, and thus improve the storage performance and transmission performance in a targeted manner after identifying sequential streams.

It should be understood that the Summary of the Invention part is provided to introduce the selection of concepts in a simplified form, which will be further described in the Detailed Description below. The Summary of the Invention part is neither intended to identify key features or main features of the present disclosure, nor intended to limit the scope of the present disclosure.

BRIEF DESCRIPTION OF THE DRAWINGS

The above and other features, advantages, and aspects of embodiments of the present disclosure will become more apparent in conjunction with the accompanying drawings and with reference to the following detailed description. In the accompanying drawings, identical or similar reference numerals represent identical or similar elements, in which.

DETAILED DESCRIPTION

Figure 1:
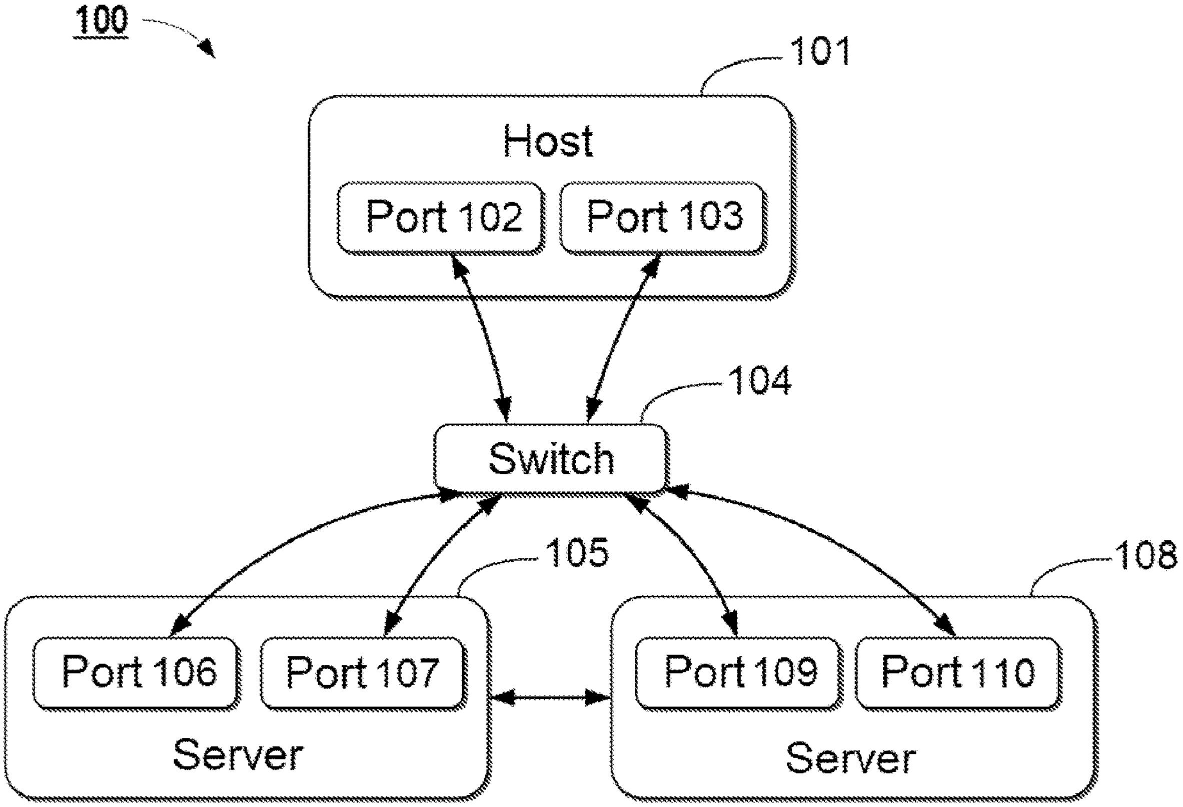
FIG. 1 illustrates a schematic diagram of an application scenario according to some embodiments of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described in more detail below with reference to the accompanying drawings. Although the accompanying drawings show some embodiments of the present disclosure, it should be understood that the present disclosure may be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of the embodiments of the present disclosure, the term “include” and similar terms thereof should be understood as open-ended inclusion, that is, “including but not limited to.” The term “based on” should be understood as “based at least in part on.” The term “an embodiment” or “the embodiment” should be understood as “at least one embodiment.” The terms “first,” “second,” and the like may refer to different or identical objects. Other explicit and implicit definitions may also be included below.

A storage system is used to process IOs. The IOs may be sent to a storage device (e.g., a disk, a solid-state disk, a USB flash drive, an optical disk, etc.), a storage server, or a storage system (e.g., a cloud storage). A plurality of IOs may constitute one or more data streams. If the addresses accessed by the plurality of IOs are contiguous, the data stream composed of these IOs is referred to as a sequential IO stream. If the addresses accessed by the plurality of IOs are random, the data stream composed of these IOs is referred to as a random IO stream. In a storage system, many functional modules need to know whether the current data access is sequential or random, and then perform corresponding processing according to the characteristics of the corresponding data access, so as to be able to access the system at a higher data transmission rate. For example, in some examples, for the cache read-ahead function of the storage system, because it always expects, when the cache reads data from the disk ahead of time, to read data that will be accessed later into the cache in advance so as to increase the access rate, the data read-ahead is more likely to be hit during a sequential access than during a random access. Therefore, the cache read-ahead function module needs to know whether the current data access is a sequential access or a random access. Read-head operations are performed only for sequential accesses, so as to improve the hit rate of the cache and thus improve the access performance of the system. For example, in some other examples, in a hybrid storage array with the SSD drive caching function, because the SSD drive device is used as a cache, its performance advantage over a mechanical hard disk drive device at the back end lies in random accesses, and its advantage is negligible for sequential accesses, the SSD drive cache expects that data to be cached be data for random accesses while data for sequential accesses would not be cached. Therefore, the SSD drive cache function module needs to know whether the current data access is a sequential access or a random access in order to conduct corresponding processing.

Each IO carries or indicates an address (logical or physical address) of the data to be accessed. The length of the data to be accessed by each IO can be either a fixed length or a variable length. The read prefetching technology can improve the bandwidth of sequential read IOs. The read prefetching technology relies on the high detection rate of sequential IO streams. If it is detected that a plurality of IOs are from a sequential stream, it will read some of the data into the cache in advance, which will greatly increase the bandwidth of subsequent sequential read IOs. The detection rate for sequential IO streams and the bandwidth of sequential read IOs are the keys to the read prefetching technology. In terms of user usage, if sequential IOs can have higher bandwidth and lower latency, it will further benefit application scenarios such as video rich media, distributed storage service (DSS) applications, and backup, replication, or migration of workloads.

When a host accesses a storage device, data accessing entities such as applications may split an access to a large chunk of data into a plurality of IO requests and send them to the storage device. There may also be multiple applications and/or multiple operating systems (e.g., virtual machines) accessing the storage device in the host, which results in interleaved IO requests from multiple accessing entities, thus making the original access to contiguous addresses discontinuous. In some other application scenarios, since the storage system is accessed concurrently by multiple hosts, the storage system needs to be able to identify sequential streams of multi-path concurrent accesses. Therefore, since the storage system supports multiple threads and multiple IO ports, the IO requests received by the storage array may arrive disorderedly even if the host sends multiple IOs in a logical block addressing (LBA) order.

To address the above mentioned situation where a sequential IO stream sent arrives disorderedly and is not identified or the like, some embodiments of the present disclosure propose a mechanism for intelligently detecting sequential streams and a method for detecting a sequential stream that can improve the accuracy of detecting sequential IO streams, thereby improving the efficiency and bandwidth of data transmission, reducing the overhead and response time, and improving the storage performance and transmission performance. The method includes: receiving a plurality of input/outputs IOs, generating corresponding IO descriptors for the received plurality of IOs, and storing the IO descriptors in a pool. The method further includes: predicting the plurality of IOs as a target sequential stream according to a plurality of IO descriptors stored in the pool that correspond to a first set of IOs; and determining that the received plurality of IOs are the target sequential stream in response to detecting that the plurality of IO descriptors stored in the pool match a second set of IOs, wherein the second set of IOs are a plurality of IOs sequentially arranged subsequent to the first set of IOs in the target sequential stream. Implementation of the method of the present disclosure can improve the rate and accuracy of detection of sequential IO streams, and thus improve the storage efficiency. For specific implementations, reference can be made to the following embodiments in combination. Further, it can be understood that in the various embodiments of the present disclosure, sequence may refer to a direction according to which addresses are increased or a direction according to which addresses are decreased, as long as it is in the same direction based on a rule.

FIG. 1 illustrates a schematic diagram 100 of an application scenario according to some embodiments of the present disclosure. Referring to FIG. 1, which illustrates the case of multiple paths between a host 101 and a server 105 and a server 108. There may be multiple connection paths between the host 101 and the server 105 and the server 108. In the example of FIG. 1, the host 101 has a plurality of ports such as a port 102 and a port 103, wherein the host 101 sends IO requests to the server 105 and the server 108 through the plurality of ports via a switch 104, and the switch 104 may also have a data distribution function. The switch 104 transfers the IO requests to a plurality of ports such as a port 106 and a port 107 of the server 105, and the switch 104 transfers the IO requests to a plurality of ports such as a port 109 and a port 110 of the server 108. It can be seen that due to multi-threaded and multi-port transmission, even though the host 101 sends the IO requests in an order, the IOs received by the storage array of the server may be in an order, may be disordered, and may also lose some data during transmission, that is, there may be missing or hopped IOs.

In some embodiments, there are situations where the IOs are received sequentially, that is, the host sends a plurality of IOs in an order, and the storage array receives the stream IOs in the same order. In one example, for example, the plurality of IOs sent are sent in an order, for example, in an order of IO_A, IO_B, IO_C, IO_D, IO_E, and IO_F, and the IOs received by the storage array also arrive in the accurate expected order of IO_A through IO_F above. After the plurality of IOs arrive at the array, IO descriptors separately identifying these IOs can be generated and stored in the IO descriptor pool. Then, after the stream detector detects the starting IO_A and IO_B in the IO descriptor pool, it expects the stream IO to be the target sequential stream IO, which includes IO_A, IO_B, IO_C, IO_D, IO_E, and IO_F in an order. The stream detector then detects that IO_C, IO_D, IO_E, and IO_F corresponding to the plurality of IO descriptors in the IO descriptor pool correspond one-to-one to the expected IOs in the identified sequential stream IO, thereby determining that the IO stream is the target sequential IO stream. After determining that this IO stream is a sequential IO stream, data prefetching for subsequent IOs can be performed to save transmission time. Specifically, reference can be made to the embodiment described in the subsequent FIG. 4.

Therefore, since the storage system supports multiple threads and multiple IO ports, the IO requests received by the storage array may arrive disorderedly even if the host sends multiple IOs in a logical block addressing order. In some embodiments, there are situations where the IOs are received non-sequentially, that is, the host sends a plurality of IOs in an order, but due to reasons of multiple threads, multiple ports, etc., the storage array does not receive these IOs in the same order, but instead, may receive the IOs disorderedly. The terms "out of order." "out of sequence." "disordered," etc. in embodiments of the present disclosure can all refer to non-sequential situations. In one example, the plurality of IOs sent are sent in an order, for example, in an order of IO_A, IO_B, IO_C, IO_D, IO_E, and IO_F, but the stream IOs received by the storage array arrive disorderedly, for example, IO_A, IO_B, IO_D, IO_E, IO_C, and IO_F, After the plurality of IOs arrive at the array, IO descriptors separately identifying these IOs can be generated and stored in the IO descriptor pool. After the stream detector detects the candidate starting IO_A, IO_B, and IO_C, it expects the stream IO to be the target sequential stream IO, and then expects the next IO to IO_C to be IO_D, Although IO_D and IO_E have arrived before IO_C arrives instead of arriving sequentially to the array, the IO descriptor pool plays a role of pooling IO identifiers, and the above IO_A to IO_F store their IO descriptors in the IO descriptor pool regardless of the order of arrival. The stream detector can select a plurality of IO descriptors corresponding to IO_C, IO_D, IO_E, and IO_F from the IO descriptor pool, and then correspond them one-to-one to the expected IO_C to IO_F in the identified target sequential stream IO, so as to determine that the IO stream is a target sequential IO stream. After determining that this IO stream is a sequential IO stream, data prefetching for subsequent IOs can be performed. Specifically, reference can be made to the embodiment described in the subsequent FIG. 5.

In some embodiments, the presence of non-sequential situations may also include situations where the IOs are sent non-sequentially or where the received IOs are hopped or missing, that is, a plurality of IOs in the IO stream sent by the host or received by the storage array are in a sequential but hopping order, but these plurality of IOs in a hopping order are in the same direction of increasing or decreasing in accordance with the LBA, For example, the sequential IOs are IO_A, IO_B, IO_C, IO_D, IO_E, and IO_F in the bitwise order, but the host sends IOs in a hopping manner or the storage array receives IOs in a hopping manner (e.g., the sending thereof is integral but some IOs are lost or delayed in transmission), and some IOs are missing. In some other embodiments, due to reasons such as limited capacity of the IO descriptor pool, the IO descriptor pool stores only the IO descriptors of some of the IOs that arrive. For example, the order of the sequential IO stream is IO_A, IO_B, IO_C, IO_D, IO_E, and IO_F, but only IO_A, IO_B, IO_C, IO_E, and IO_F are in the IO descriptor pool. In the above case where the IO descriptors are missing and cannot correspond one-to-one to the target sequential stream, a plurality of range windows can be delineated in embodiments of the present disclosure, each including one or more IOs. If the stream detector can select some of the IOs in the IO descriptor pool to be located in the delineated range windows, and these hit windows are windows sequentially arranged, the stream detector can determine that the received IO stream is the target sequential stream. Specifically, reference can be made to the embodiments described in the subsequent FIGS. 6 and 7.

Figure 2:
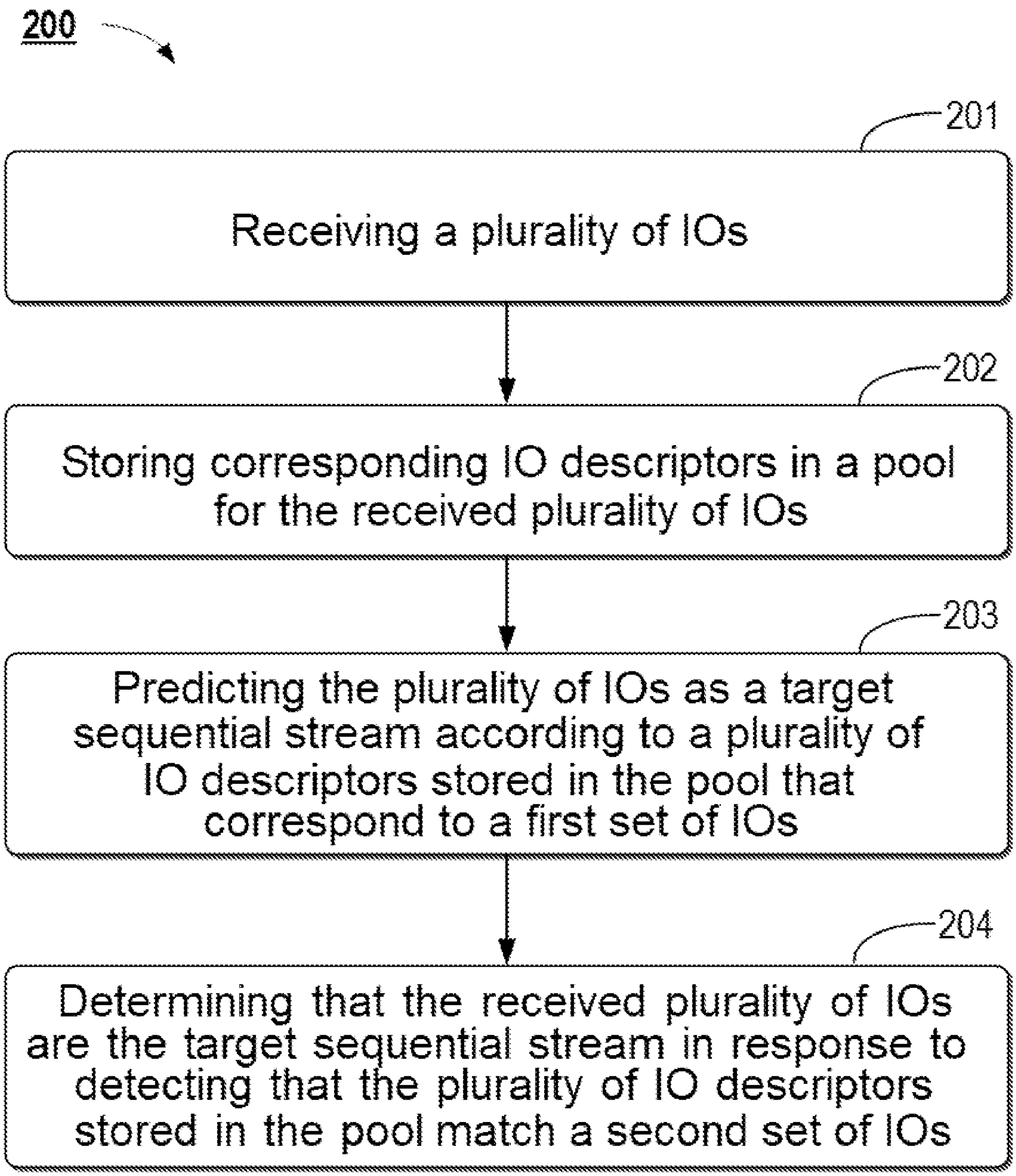
FIG. 2 illustrates a flow chart of a method for detecting a sequential stream according to some embodiments of the present disclosure.

FIG. 2 illustrates a flow chart of a method 200 according to some embodiments of the present disclosure. The method 200 may be performed by an electronic device. The electronic device may include, but is not limited to, a personal computer (PC), a server computer, a handheld or laptop device, a mobile terminal, a multiprocessor system, or a combination thereof. The embodiments of the present disclosure do not make any limitation to the device type and the like of the electronic device that implements the method 200. It should be understood that, in the embodiments of the present disclosure, the subject implementing the method 200 may be implemented by an entity device or may be implemented by a plurality of entity devices together. It can be understood that the main body implementing the method 200 may be a logical function module in an entity device, or may be a logical function module composed of a plurality of entity devices. It should be understood that, in the following embodiments of the present disclosure, the steps in the method provided in the embodiments of the present disclosure may be performed by one entity device, or the steps in the method provided in the embodiments of the present disclosure may be performed by a plurality of entity devices cooperatively, which is not limited in the embodiments of the present disclosure. It should be understood that the method 200 may also include additional blocks that are not shown and/or may omit blocks that are shown, and the scope of the present disclosure is not limited in this regard.

At block 201, a plurality of IOs are received. At block 202, corresponding IO descriptors are stored in a pool for the received plurality of IOs. At block 203, the plurality of IOs are predicted as a target sequential stream according to a plurality of IO descriptors stored in the pool that correspond to a first set of IOs. At block 204, it is determined that the received plurality of IOs are the target sequential stream in response to detecting that the plurality of IO descriptors stored in the pool match a second set of IOs, wherein the second set of IOs are a plurality of IOs sequentially arranged subsequent to the first set of IOs in the target sequential stream. Implementation of the method 200 can improve the efficiency and accuracy of detecting sequential streams.

In conjunction with the preceding embodiments, in some embodiments of the present disclosure, the target sequential stream can be divided into a plurality of windows, each of the plurality of windows including one or more IOs. It is determined that the received plurality of IOs are the target sequential stream in response to detecting that the plurality of IOs corresponding to the plurality of IO descriptors stored in the pool are separately located in windows following the first set of IOs sequentially arranged. Specifically, reference can be made in conjunction with the embodiment described with reference to FIG. 6.

In conjunction with the preceding embodiments, in some other embodiments of the present disclosure, the target sequential stream is divided into a plurality of windows, each of the plurality of windows including one or more IOs. The target sequential stream includes a first set of windows and a second set of windows that are sequentially arranged, subsequent windows to the first set of windows being the second set of windows. The plurality of IOs are predicted as the target sequential stream based on the plurality of IOs corresponding to the plurality of IO descriptors stored in the pool being located in the first set of windows, respectively. In some embodiments, it is determined that the received plurality of IOs are the target sequential stream in response to detecting that the plurality of IOs corresponding to the plurality of IO descriptors stored in the pool are separately located in the second set of windows sequentially arranged. Specifically, reference can be made in conjunction with the embodiment described with reference to FIG. 7.

In conjunction with the preceding embodiments, in some embodiments of the present disclosure, the plurality of IOs sequentially arranged are a plurality of IOs with contiguous addresses. In conjunction with the preceding embodiments, in some other embodiments of the present disclosure, the plurality of IOs sequentially arranged mean that the IOs are a plurality of IOs of which the addresses hop but increase or decrease in the same direction. In conjunction with the preceding embodiments, in some other embodiments of the present disclosure, the received plurality of IOs are non-sequential, for example, being disordered or hopping. Specifically, reference can be made in conjunction with the embodiments described in FIGS. 4 to 7.

In conjunction with the preceding embodiments, in some other embodiments of the present disclosure, the plurality of IO descriptors stored in the pool are compared by a stream detector with the IOs in the target sequential stream. In conjunction with the preceding embodiments, in some other embodiments of the present disclosure, the IO descriptors include one or more of the following parameters: a length or an offset. Specifically, reference can be made in conjunction with the embodiment described with reference to FIG. 3.

In some other embodiments of the present disclosure, in conjunction with the previously described method, in response to determining that the received plurality of IO requests are the target sequential stream, data subsequent to the target sequential stream is accessed from a disk array into a cache in advance. Upon receiving a new IO request, the new IO request is searched for from the cache. If data for the new IO request is found in the cache, the data corresponding to the new IO request is returned from the cache. The new IO request is sent to the disk array if the data for the new IO request is not found in the cache. Specifically, reference can be made in conjunction with the embodiment described in FIG. 8.

Figure 3:
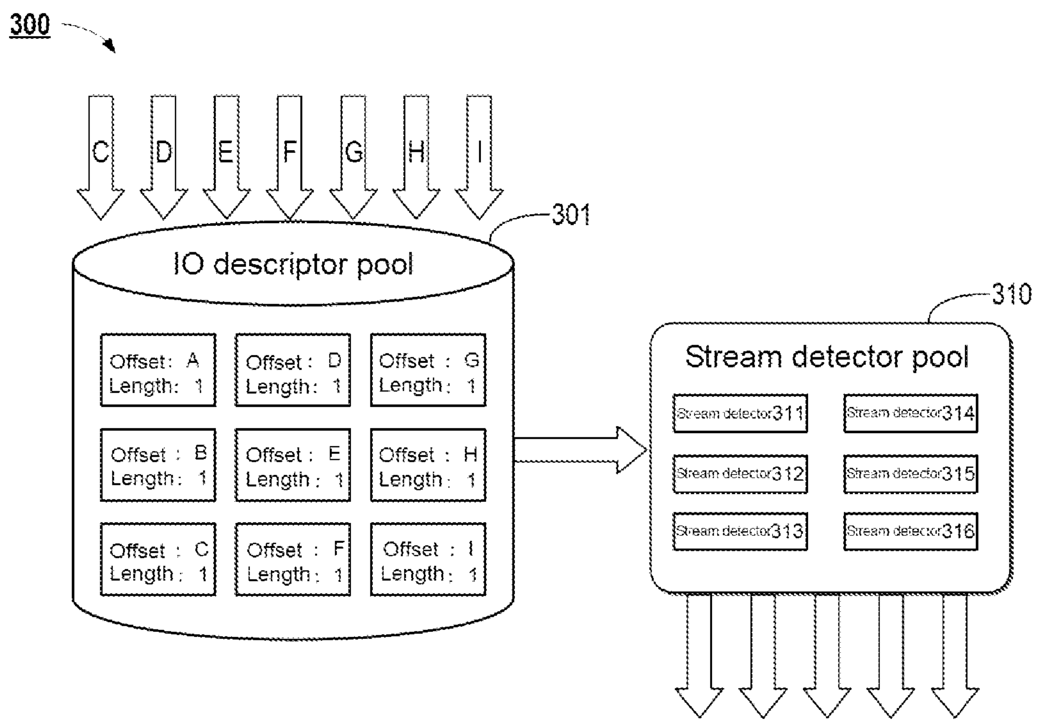
FIG. 3 illustrates a schematic diagram of an intelligent stream detection structure according to some embodiments of the present disclosure.

In some embodiments of the present disclosure, an intelligent stream detection mechanism may be employed to detect sequential IO streams. FIG. 3 illustrates an architecture 300 of an intelligent stream detection mechanism included in some embodiments of the present disclosure. The intelligent stream detection structure 300 may include at least: an IO descriptor pool 301 and a stream detector pool 310. Among them, the IO descriptor pool 301 includes one or more IO descriptors, and the IO descriptors may contain descriptions of one or more IO distinguishing features, for example, parameters such as offset and length. For example, in FIG. 3, the offsets of IO_A to IO_I are their respective addresses, and the lengths thereof are all 1. When an IO request arrives, the distinguishing features (such as the offset and the length) of these IOs are identified and placed in the IO descriptor pool 301. As shown in FIG. 3, when a sequential IO stream is detected to arrive, for example, IO_A, IO_B, IO_C, IO_D, IO_E, IO_F, IO_G, IO_H, IO_I, etc., the offsets and lengths of these IOs are identified as corresponding descriptors, and these IO descriptors are stored in the IO descriptor pool 301. The stream detector pool 310 includes one or more stream detectors, for example, a stream detector 311, a stream detector 312, a stream detector 313, a stream detector 314, a stream detector 315, a stream detector 316, etc., wherein these stream detectors are used to select IOs from the IO descriptor pool and then match them with the identified IO stream (which may also be referred to as the target sequential stream) in order to identify whether the received IO stream is a sequential IO stream. The correspondence between stream detectors and IO descriptors is not limited in embodiments of the present disclosure. In conjunction with the intelligent stream detection structure 300 shown in FIG. 3, some embodiments of the present disclosure can address the problem of accurately identifying sequential IO streams when the arriving IOs are non-sequential.

Figure 4:
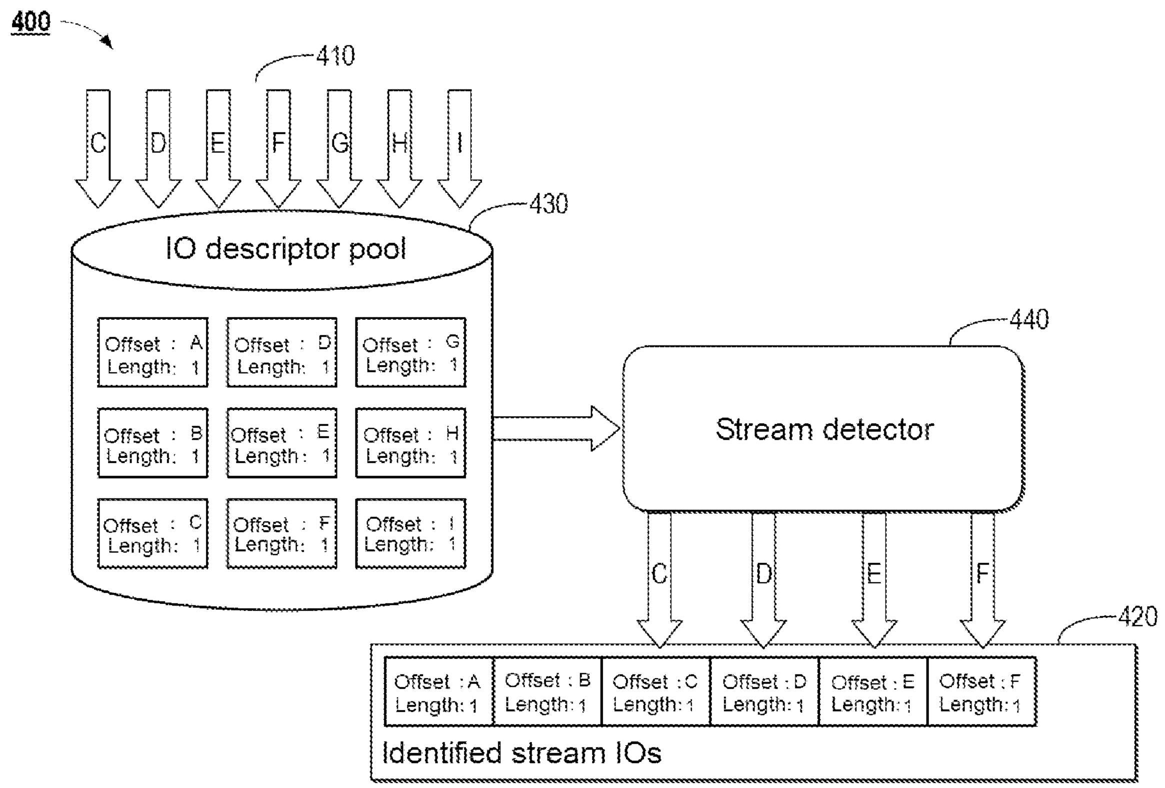
FIG. 4 illustrates a schematic diagram of detecting a stream according to some embodiments of the present disclosure.

FIG. 4 illustrates a schematic diagram 400 that incorporates the intelligent stream detection structure 300 to handle the case where the arriving IOs are sequential. In the example of FIG. 4, multiple IOs of an IO stream 410 arrive exactly in an order, that is, after IO_A and IO_B, the arrival is in the order of IO_C, IO_D, IO_E, IO_F, IO_G, IO_H, IO_I, etc. Upon the arrival of each IO, an IO descriptor is created for each IO (such as IO_A to IO_I in FIG. 4) and stored in the IO descriptor pool 430. When identifying IO_A and IO_B as the starting IOs of the sequential stream IO 420 (which may also be referred to as the target sequential stream), the stream detector 440 expects that the IOs received later include one or more of IO_C, IO_D, IO_E, IO_F, IO_G, IO_H, IO_I, etc. The stream detector 440 then selects the stored IO_C, IO_D, IO_E, IO_F, IO_G, IO_H, IO_I, etc., from the IO descriptor pool 430, which correspond exactly one-to-one to IOs subsequent to IO_A and IO_B in the sequential stream IO 420 in an order. Therefore, the stream detector 440 determines that the received IO stream 410 is a sequential stream.

Figure 5:
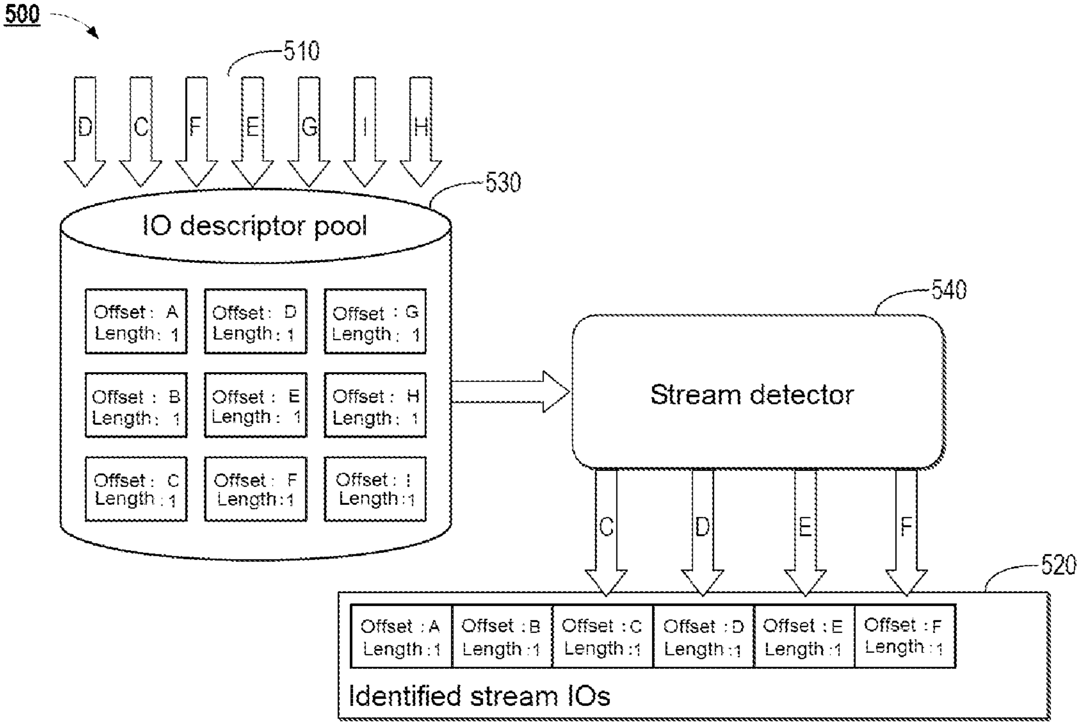
FIG. 5 illustrates a schematic diagram of detecting a stream according to some embodiments of the present disclosure.

FIG. 5 illustrates a schematic diagram 500 that incorporates the intelligent stream detection structure 300 to handle the case where the arriving IOs are disordered. In the example of FIG. 5, the arrival of multiple IOs of the IO stream 510 is out of sequence, for example, the order of arrival of IOs following IO_A and IO_B is the order of IO_D, IO_C, IO_F, IO_E, IO_G, IO_I, IO_H, etc. Upon the arrival of each IO, an IO descriptor is created for each IO (such as IO_A to IO_I in FIG. 5) and stored in the IO descriptor pool 530. When identifying IO_A and IO_B as the starting IOs of the sequential stream IO 520 (which may also be referred to as the target sequential stream), the stream detector 540 expects that the IOs received later include one or more of IO_C, IO_D, IO_E, IO_F, IO_G, IO_H, IO_I, etc. The stream detector 540 then selects the stored IO_C, IO_D, IO_E, IO_F, IO_G, IO_H, IO_I, etc., from the IO descriptor pool 530, which correspond exactly one-to-one to IOs subsequent to IO_A and IO_B in the sequential stream IO 520 in an order. Therefore, the stream detector 540 determines that the received IO stream 510 is a sequential stream.

In some embodiments, the capacity of the IO descriptor pool is limited and dynamic, and thus may not cache enough IO descriptors. In some other embodiments, the IOs sent by the sender are hopping, or there are IOs missing from the currently received IO stream (e.g., lost or delayed due to transmission), and if the missing IOs are late, waiting for them costs time and efficiency. In these cases, a range window can be defined, and, as long as the arriving IO is within the range window, it can be confirmed that a sequential IO stream is detected without the need to wait for the exact next IO of the last matching IO.

Figure 6:
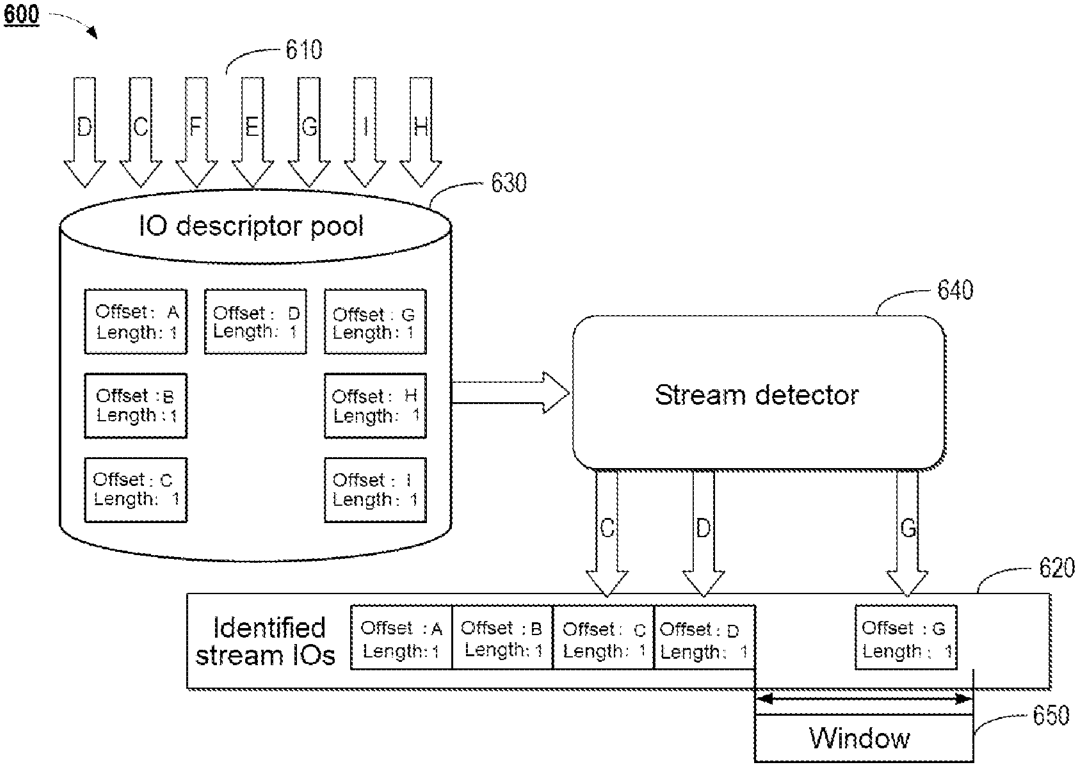
FIG. 6 illustrates a schematic diagram of detecting a stream according to some embodiments of the present disclosure.

FIG. 6 illustrates a schematic diagram 600 that incorporates the intelligent stream detection structure 300 to handle the case of missing IOs. In the example of FIG. 6, the arrival of multiple IOs of the IO stream 610 is out of sequence, for example, IOs arriving following IO_A and IO_B include IO_D, IO_C, IO_F, IO_E, IO_G, IO_I, IO_H, etc. Upon the arrival of an IO, an IO descriptor is created for the IO and stored in the IO descriptor pool 630, but possibly due to the limited capacity, the IO descriptor pool 630 only stores IO descriptors for some of the arriving IOs. For example, the IO descriptor pool 630 shown in FIG. 6 saves IO_A, IO_B, IO_C, IO_D, IO_G, IO_H, and IO_I, but does not save IO descriptors for IO_E and IO_F, When identifying IO_A and IO_B as the starting IOs of the sequential stream IO 620 (which may also be referred to as the target sequential stream), the stream detector 640 expects that the IOs received later include one or more of IO_C, IO_D, IO_E, IO_F, IO_G, IO_H, IO_I, etc. In this example, a window 650 is delineated, for example, the window 650 is located between IO_D and IO_I. The stream detector 640 then selects the stored IO_C, IO_D, IO_G, etc. from the IO descriptor pool 630, and although there is no IO_E or IO_F corresponding to IO_E and IO_F of the sequential stream 620, because of the delineated window 650, as long as there exists an IO that falls within the range of that window 650, for example, the selected IO_G falls within the range of the window 650, it is determined by the stream detector 640 that the received IO stream 610 is a sequential stream.

Figure 7:
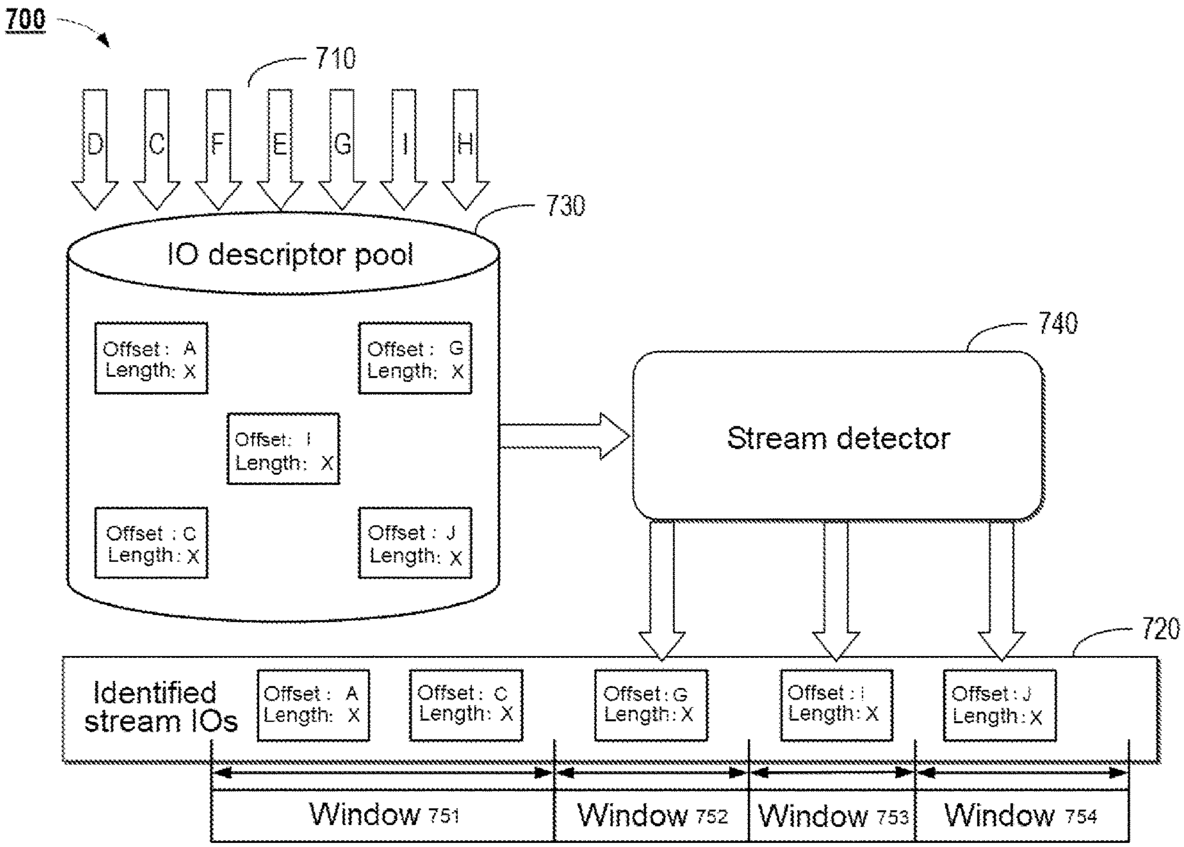
FIG. 7 illustrates a schematic diagram of detecting a stream according to some embodiments of the present disclosure.

Further, in some other embodiments, some IOs are not in the IO descriptor pool, but some IOs that have arrived are distributed in different range windows, and these arrived IOs can still be detected as a sequential stream as long as these windows are sequentially adjacent. FIG. 7 illustrates a schematic diagram 700 that incorporates the intelligent stream detection structure 300 to handle the case of intermittent IOs. In the example of FIG. 7, the arrival of multiple IOs of the IO stream 710 is out of sequence, for example, IOs arriving following IO_A include IO_D, IO_C, IO_F, IO_E, IO_G, IO_I, IO_H, etc. Upon the arrival of an IO, an IO descriptor is created for the IO and stored in the IO descriptor pool 730, but possibly due to the limited capacity, the IO descriptor pool 730 only stores IO descriptors for some of the arriving IOs. For example, the IO descriptor pool 730 shown in FIG. 7 saves IO_A, IO_C, IO_G, IO_I, and IO_J. In this example, windows 751, 752, 753, 754, etc. are delineated, and whenever the stream detector 740 detects that the range windows hit by the IOs included in the IO descriptor pool 730 are sequentially adjacent, it confirms that the IO stream that has arrived is a sequential stream.

For example, in the example shown in FIG. 7, IO_A and IO_C fall within the range of the window 751, IO_G falls within the range of the window 752, IO_I falls within the range of the window 753, and IO_J falls within the range of the window 754, and so on. When the window 751 is regarded as the starting window of the sequential stream IO 720 (which may also be referred to as the target sequential stream), the stream detector 740 detects that windows 752, 753, and 754 that are subsequently hit by IOs are sequentially arranged, and therefore the stream detector 740 determines that the received IO stream 710 is a sequential stream.

In each of the foregoing embodiments, there is no limitation to the size of the IO, and either a fixed size or a variable size can be applied to each of the embodiments of the present disclosure and combinations thereof.

According to the various embodiments of the present disclosure described above and combined embodiments thereof, both the host and the array have multiple ports and multiple threads, and when sequential IOs from the host arrive at the array, these IOs may become disordered IOs. Regardless of whether the IO stream arrives in sequence or disorderedly, or even in a sequential but hopping mode, the intelligent stream detector provided in the present disclosure enables more accurate and higher speed detection of sequential IO streams, thereby leading to higher input/output per second (IOPS) as well as lower response latency, thus improving the storage performance and transmission performance. In addition, the intelligent stream detector has the extended ability to detect sequential but hopping IOs with a range window mechanism.

It should be understood that the implementations illustrated in FIGS. 3 through 7 above are only schematic, and depending on an actual application, the architecture or process illustrated in FIGS. 3 through 7 may take other different forms and may also include more or fewer one or more functional modules and/or units, which may be partially or fully implemented as hardware modules, software modules, firmware modules, or any combination thereof, and embodiments of the present disclosure are not limited in this regard.

When the stream detector identifies that an IO in progress is of a sequential stream, the prefetch mechanism reads a certain sequence of data of the stream and places it in the cache. Ideally, when a subsequent read request arrives, the data can be read directly from the cache, which can increase the read bandwidth and reduces the read latency for the stream. For example, the cache will actively identify the features of the IO stream, and if it finds that the stream is a sequential IO stream, then while going down to the disk to read IOs, the cache will actively read large blocks of data from adjacent areas into the cache. When sequential IOs are sent down to the cache and the cache is found to already hold the required data, this data is returned directly without the need to go down to the disk to read it again. One of the special cases of data prefetching is "full hit." In the full hit condition, all the data that the service needs to read has been saved in the cache, so there is no need to go down to the disk for further processing, that is, all the IOs are returned at the cache level with the shortest path and latency. The input/output per second (IOPS) value of a full hit read is often the optimal IOPS value that a storage product can provide.

Figure 8:
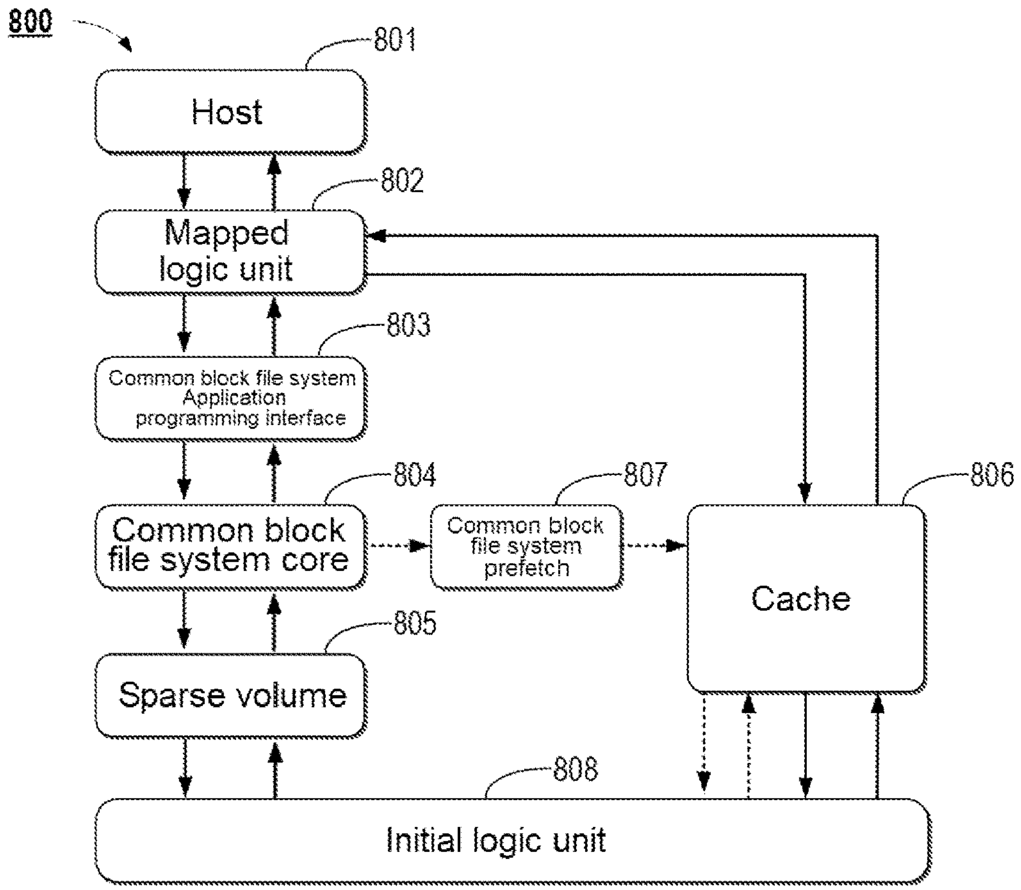
FIG. 8 illustrates a schematic diagram of prefetching data according to some embodiments of the present disclosure.

Referring to FIG. 8. FIG. 8 illustrates a schematic diagram 800 of a data path flow for data prefetching in an IO read operation of the storage system in some embodiments. As shown in the example in FIG. 8, a host 801 sends an IO request to a mapped logic unit (MLU) 802, and the MLU 802 sends an IO request to a common block file system (CBFS) application programming interface (API) 803 to query mapping. Various metadata and file data can be mapped to different streams in the CBFS, and the CBFS can send the data and its hierarchy to the underlying storage drive. Other multi-layer structures can be included between the CBFS and the storage drive. For example, the CBFS transfers data and its hierarchy to a CBFS core 804 in the next layer, and then the CBFS core 804 sends the data to a sparse volume 805, etc., then it is populated with other data packet information, and a request is subsequently sent to the underlying storage drive. After the MLU 802 acquires the data mapping from the CBFS API 803, it can read data from a cache 806. If the cache 806 hits, the data will be returned from the cache 806, and the read IO request will be responded to immediately; and if the cache 806 does not hit, it will send a request to read IO data from an initial logic unit (FLU) 808. Multiple initial logic units correspond to the storage area of the physical storage disk, and in some examples, the initial logic units can be mapped into multiple mapped logic units, e.g., multiple FLUs can be consumed, multiple FLUs can be sliced and/or diced, and then multiple MLUs, e.g., thin logic units (TLUs), can be output. This dynamic mapping between physical storage locations and logical storage locations can support resolving multiple logical locations to a single physical location, etc.

For read services, the cache acceleration is mainly embodied in read hits. Therefore, if data is hit by the cache 806, the read IO request can obtain higher transmission bandwidth and lower response latency. Data prefetching is a speculative optimization method that can reduce the read IO latency and increase the read IO bandwidth. An intelligent prefetching policy is used to dynamically analyze the IO sequential situation and IO size pattern of the current service to determine whether to start and stop prefetching and the size of the prefetching window. In some embodiments, to reduce the cost of read operations of data chunks on the FLU 808, the CBFS prefetch 807 will attempt to identify the sequential streams of the read IOs and then prefetch large data segments to the cache 806 in advance.

With the sequential stream identification and prefetching algorithm, the system can read large chunks of contiguous data on the disk in advance and store them in the cache, and subsequent large numbers of sequential small IOs can be hit in the cache without the need of going down to the disk for processing. Random small IOs, on the other hand, have a very low hit rate in the cache and can only be read one by one by going down to the disk. Therefore, efficient and fast identification of whether an IO stream is a sequential IO stream or a random IO stream can improve the storage efficiency.

It is to be understood that the specific names and/or protocols of the various components of the system described herein are intended only to help those skilled in the art better understand the ideas of the present disclosure and are not intended to limit the scope of the present disclosure in any way. Further, in some other embodiments, more or better components, as well as alternative components having the same or similar functionality, may be included.

Figure 9:
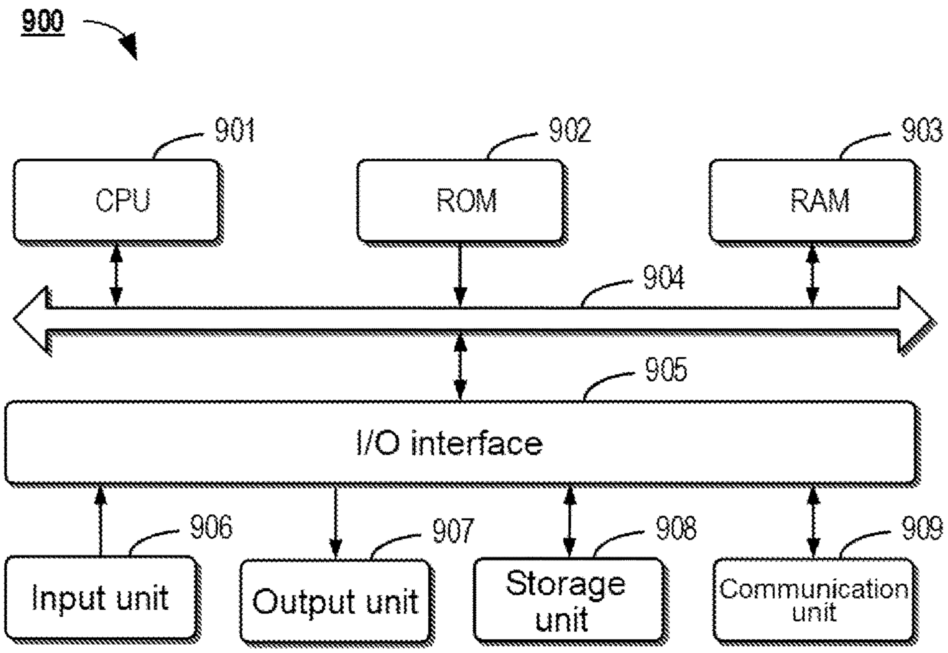
FIG. 9 illustrates a schematic structural diagram of a device that can be used to implement embodiments of the present disclosure.

FIG. 9 illustrates a schematic structural diagram of an example device 900 that can be used to implement some embodiments of the present disclosure. The device 900 may be implemented as a server or a PC, The embodiments of the present disclosure do not limit the specific implementation type of the device 900. As shown in FIG. 9, the device 900 includes a central processing unit (CPU) 901 that may perform various appropriate actions and processing according to computer program instructions stored in read-only memory (ROM) 902 or computer program instructions loaded from a storage unit 908 into random access memory (RAM) 903. Various programs and data required for the operation of the device 900 may also be stored in the RAM 903. The CPU 901, the ROM 902, and the RAM 903 are connected to each other through a bus 904. An input/output (I/O) interface 905 is also connected to the bus 904.

A plurality of components in the device 900 are connected to the I/O interface 905, including: an input unit 906, such as a keyboard and a mouse; an output unit 907, such as various types of displays and speakers; a storage unit 908, such as a magnetic disk and an optical disc; and a communication unit 909, such as a network card, a modem, and a wireless communication transceiver. The communication unit 909 allows the device 900 to exchange information/data with other devices via a computer network such as the Internet and/or various telecommunication networks.

The processing unit 901 may execute the various methods and/or processing described above, such as the method 200. For example, in some embodiments, the method 200 may be implemented as a computer software program that is tangibly included in a machine-readable medium, such as the storage unit 908. In some embodiments, part or all of the computer program may be loaded and/or installed onto the device 900 via the ROM 902 and/or the communication unit 909. When the computer program is loaded onto the RAM 903 and executed by the CPU 901, one or more steps of the method 200 described above may be performed. Alternatively, in some other embodiments, the CPU 901 may be configured to perform the method 200 in any other suitable manners (e.g., by means of firmware).

The functions described herein above may be performed, at least in part, by one or a plurality of hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Load Programmable Logic Device (CPLD), and the like.

In some embodiments, the methods and processes described above may be implemented as a computer program product. The computer program product may include a computer-readable storage medium on which computer-readable program instructions for performing various aspects of the present disclosure are loaded.

Program code for implementing the method of the present disclosure may be written by using one programming language or any combination of a plurality of programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code can be completely executed on a machine, partially executed on a machine, partially executed on a machine as an independent software package and partially executed on a remote machine, or completely executed on a remote machine or a server.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams. The computer-readable program instructions may also be loaded to a computer, other programmable data processing apparatuses, or other devices, so that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combinations thereof.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions marked in the blocks may also occur in an order different from that marked in the accompanying drawings. For example, two successive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Additionally, although operations are depicted in a particular order, this should be understood that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

Various embodiments of the present disclosure have been described above. The foregoing description is illustrative rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or the technical improvements to technologies on the market, or to enable other people of ordinary skill in the art to understand the various embodiments disclosed herein.

The invention claimed is:

1. A method for detecting a sequential stream, the method comprising:

receiving a plurality of input/outputs (IOs), wherein the addresses of the respective IOs of the plurality of IOs, in the order the plurality of IOs were received, are non-sequential;

generating corresponding IO descriptors for the plurality of IOs by, upon receipt of each one of the plurality of IOs, generating an IO descriptor corresponding to the IO that separately identifies the IO;

storing, upon receipt of the plurality of IOs and in response to a limited capacity of a pool, the corresponding IO descriptors into the pool for less than all of the received plurality of IOs;

predicting the plurality of IOs as a target sequential stream according to a plurality of IO descriptors stored in the pool that correspond to a first set of IOs;

detecting that the plurality of IO descriptors stored in the pool match a second set of IOs, wherein the second set of IOs is a plurality of IOs sequentially arranged subsequent to the first set of IOs in the target sequential stream;

in response to the detecting that the plurality of IO descriptors stored in the pool match a second set of IOs, determining that the received plurality of IOs are the target sequential stream;

dividing the target sequential stream into a plurality of windows, the plurality of windows including one or more windows comprising multiple IOs and one or more windows comprising one IO;

detecting that the plurality of IOs corresponding to the plurality of IO descriptors stored in the pool are separately located in windows following the first set of IOs sequentially arranged; and in response to the detecting that the plurality of IOs corresponding to the plurality of IO descriptors stored in the pool are separately located in windows following the first set of IOs sequentially arranged, determining that the received plurality of IOs are the target sequential stream.

2. The method according to claim 1, further comprising:

the target sequential stream comprising a first set of windows and a second set of windows that are sequentially arranged, subsequent windows to the first set of windows being the second set of windows; and predicting the plurality of IOs as the target sequential stream based on the plurality of IOs corresponding to the plurality of IO descriptors stored in the pool being located in the first set of windows, respectively.

3. The method according to claim 2, further comprising:

detecting that the plurality of IOs corresponding to the plurality of IO descriptors stored in the pool are separately located in the second set of windows sequentially arranged; and in response to the detecting that the plurality of IOs corresponding to the plurality of IO descriptors stored in the pool are separately located in the second set of windows sequentially arranged, determining that the received plurality of IOs are the target sequential stream.

4. The method according to claim 1, wherein the plurality of IOs sequentially arranged mean that the IOs are a plurality of IOs of which the addresses hop but increase or decrease in the same direction.

5. The method according to claim 1, further comprising:

comparing, by a stream detector, the plurality of IO descriptors stored in the pool with the IOs in the target sequential stream.

6. The method according to claim 1, wherein the IO descriptors comprise one or more of the following parameters: a length or an offset.

7. The method according to claim 1, further comprising:

accessing, in response to determining that the received plurality of IO requests are the target sequential stream, data subsequent to the target sequential stream from a disk array into a cache in advance;

searching for, upon receiving a new IO request, the new IO request from the cache;

returning, if data for the new IO request is found in the cache, data corresponding to the new IO request from the cache; and sending the new IO request to the disk array if the data for the new IO request is not found in the cache.

8. An electronic device, comprising:

a processor; and a memory coupled to the processor and having instructions stored therein, wherein the instructions, when executed by the processor, cause the electronic device to perform operations comprising:

receiving a plurality of input/outputs (IOs), wherein the addresses of the respective IOs of the plurality of IOs, in the order the plurality of IOs were received, are non-sequential;

generating corresponding IO descriptors for the plurality of IOs by, upon receipt of each one of the plurality of IOs, generating an IO descriptor corresponding to the IO that separately identifies the IO;

storing, upon receipt of the plurality of IOs and in response to a limited capacity of a pool, the corresponding IO descriptors into the pool for less than all of the received plurality of IOs;

predicting the plurality of IOs as a target sequential stream according to a plurality of IO descriptors stored in the pool that correspond to a first set of IOs;

detecting that the plurality of IO descriptors stored in the pool match a second set of IOs, wherein the second set of IOs is a plurality of IOs sequentially arranged subsequent to the first set of IOs in the target sequential stream; and in response to the detecting that the plurality of IO descriptors stored in the pool match a second set of IOs, determining that the received plurality of IOs are the target sequential stream;

dividing the target sequential stream into a plurality of windows, the plurality of windows including one or more windows comprising multiple IOs and one or more windows comprising one IO;

detecting that the plurality of IOs corresponding to the plurality of IO descriptors stored in the pool are separately located in windows following the first set of IOs sequentially arranged; and in response to the detecting that the plurality of IOs corresponding to the plurality of IO descriptors stored in the pool are separately located in windows following the first set of IOs sequentially arranged, determining that the received plurality of IOs are the target sequential stream.

9. The electronic device according to claim 8, wherein the operations further comprise:

the target sequential stream comprising a first set of windows and a second set of windows that are sequentially arranged, subsequent windows to the first set of windows being the second set of windows; and predicting the plurality of IOs as the target sequential stream based on the plurality of IOs corresponding to the plurality of IO descriptors stored in the pool being located in the first set of windows, respectively.

10. The electronic device according to claim 9, wherein the operations further comprise:

detecting that the plurality of IOs corresponding to the plurality of IO descriptors stored in the pool are separately located in the second set of windows sequentially arranged; and in response to the detecting that the plurality of IOs corresponding to the plurality of IO descriptors stored in the pool are separately located in the second set of windows sequentially arranged, determining that the received plurality of IOs are the target sequential stream.

11. The electronic device according to claim 8, wherein the plurality of IOs sequentially arranged mean that the IOs are a plurality of IOs of which the addresses hop but increase or decrease in the same direction.

12. The electronic device according to claim 8, wherein the operations further comprise:

comparing, by a stream detector, the plurality of IO descriptors stored in the pool with the IOs in the target sequential stream.

13. The electronic device according to claim 12, wherein the IO descriptors comprise one or more of the following parameters: a length or an offset.

14. A computer program product having a non-transitory computer readable medium which stores a set of instructions to detect a sequential stream; the set of instructions, when carried out by computerized circuitry, causing the computerized circuitry to perform a method of:

receiving a plurality of input/outputs (IOs), wherein the addresses of the respective IOs of the plurality of IOs, in the order the plurality of IOs were received, are non-sequential;

generating corresponding IO descriptors for the plurality of IOs by, upon receipt of each one of the plurality of IOs, generating an IO descriptor corresponding to the IO that separately identifies the IO;

storing, upon receipt of the plurality of IOs and in response to a limited capacity of a pool, the corresponding IO descriptors into the pool for less than all of the received plurality of IOs;

predicting the plurality of IOs as a target sequential stream according to a plurality of IO descriptors stored in the pool that correspond to a first set of IOs;

detecting that the plurality of IO descriptors stored in the pool match a second set of IOs, wherein the second set of IOs is a plurality of IOs sequentially arranged subsequent to the first set of IOs in the target sequential stream;

in response to the detecting that the plurality of IO descriptors stored in the pool match a second set of IOs, determining that the received plurality of IOs are the target sequential stream;

dividing the target sequential stream into a plurality of windows, the plurality of windows including one or more windows comprising multiple IOs and one or more windows comprising one IO;

detecting that the plurality of IOs corresponding to the plurality of IO descriptors stored in the pool are separately located in windows following the first set of IOs sequentially arranged; and in response to the detecting that the plurality of IOs corresponding to the plurality of IO descriptors stored in the pool are separately located in windows following the first set of IOs sequentially arranged, determining that the received plurality of IOs are the target sequential stream.

* * * * *